UNITED STATES PATENT OFFICE.

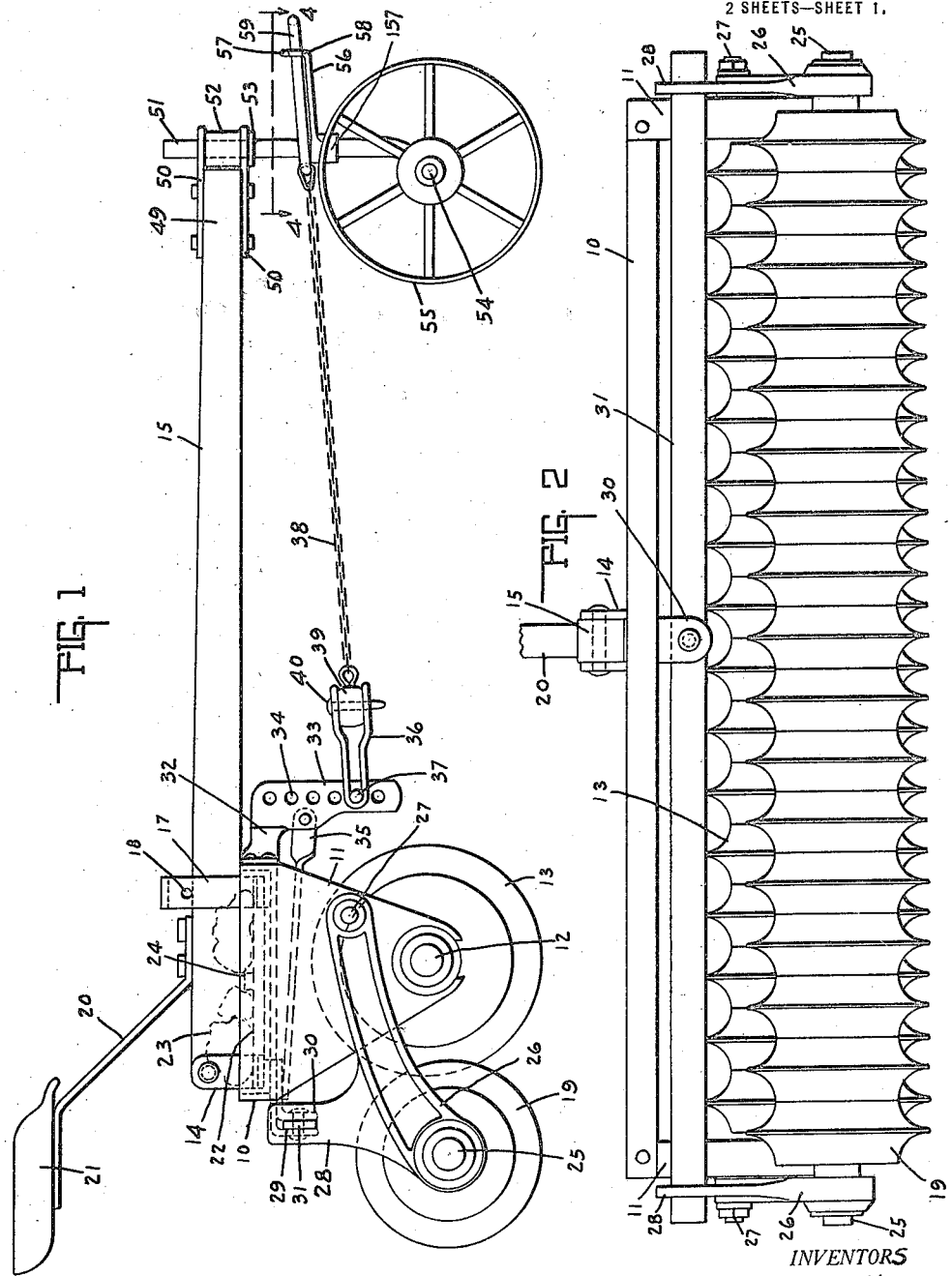

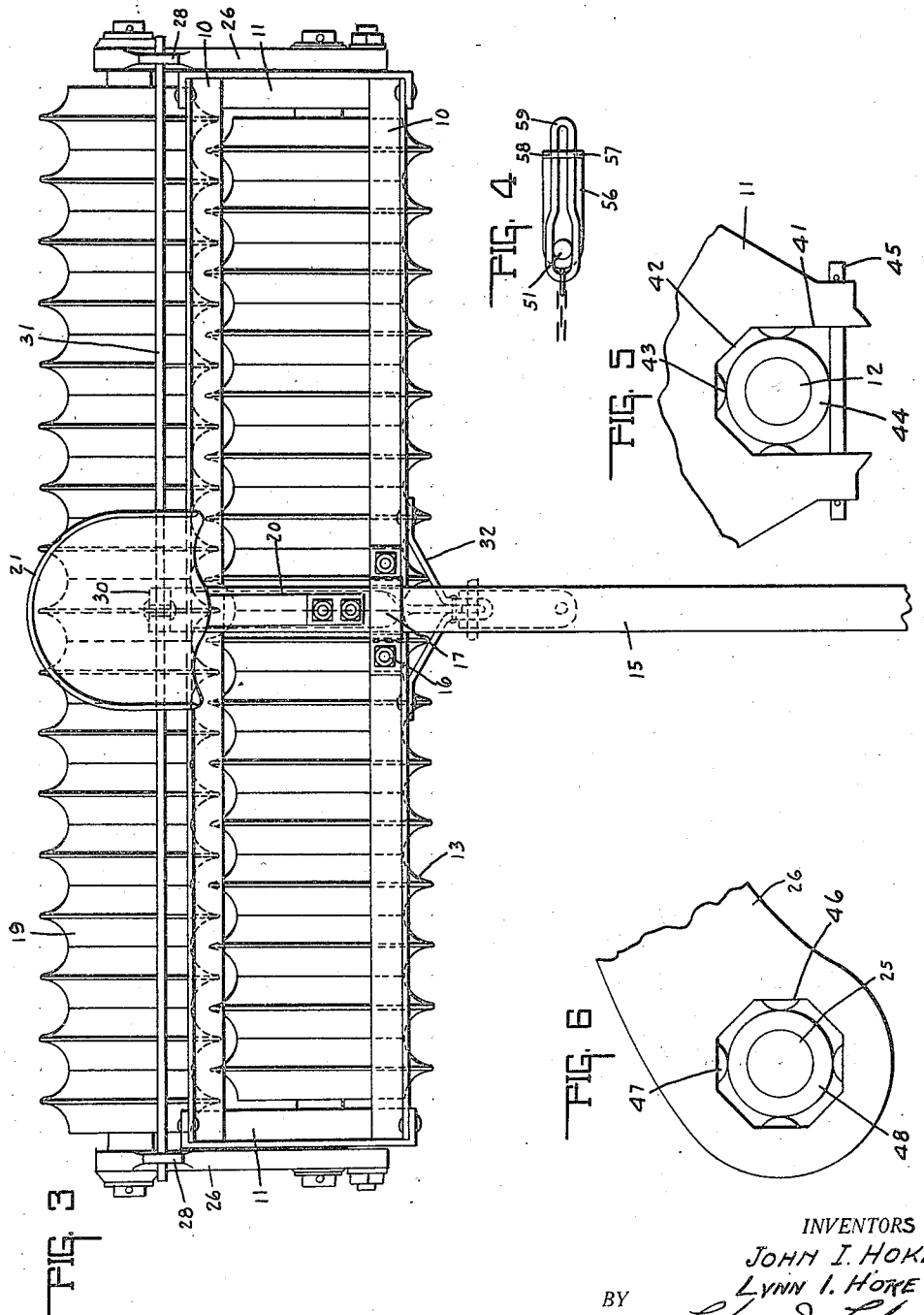

JOHN I. HOKE AND LYNN I. HOKE, OF SOUTH BEND, INDIANA.

CLOD CRUSHER AND PACKER.

1,424,906.

Specification of Letters Patent. Patented Aug. 8, 1922.

Application filed May 23, 1921. Serial No. 473,527.

*To all whom it may concern:*

Be it known that we, JOHN I. HOKE and LYNN I. HOKE, citizens of the United States, and residents of South Bend, county of St. Joseph, and State of Indiana, have invented a certain new and useful Clod Crusher and Packer; and we do hereby declare that the following is a full, clear, and exact description thereof, reference being had to the accompanying drawings, in which like numerals refer to like parts.

This invention relates to agricultural implements of the clod crusher, roller, pulverizer and packer type. The chief object of this invention is to provide an improved agricultural implement which is equipped with means whereby the same may be universally used and adapted to the conditions encountered.

The chief feature of the invention consists in the particular mounting and arrangement of the plurality of rows of cultivating wheels, whereby the load applied by draft or by the weight or by both may be apportioned between said rows of wheels as desired.

Another feature of the invention consists in the mounting of some of the wheels such that the same will follow the contour of the ground without transferring said movement to the propelling means.

Another feature of the invention consists in the adjustable draft mechanism of the packer, whereby the load may be apportioned between the rows of cultivating wheels as desired.

Still a further feature of the invention consists in the particular mounting of the tongue upon the packer whereby when the packer is used with a plurality of rows of cultivating wheels the movement of the packer frame will not be transmitted to the draft animals or the draft means through the tongue, but which will also permit the tongue to be rigidly secured to the packer so that the same can be used with a single row of cultivating wheels when desired.

Still another feature of the invention consists in the means associated with the forecarriage construction whereby shortening of the draft chain is prevented in turning and which also permits the chain to be effectively shortened and lengthened in the rocking movement of the packer frame.

The full nature of this invention will be understood from the accompanying drawings and the following description and claims.

In the drawings Fig. 1 is a side elevational view of the packer embodying the features of the invention and showing the same equipped with a forecarriage. Fig. 2 is a rear elevational view of said packer. Fig. 3 is a top plan view of the packer. Fig. 4 is a plan view of the forecarriage hitch and is taken on the line 4—4 of Fig. 1 and in the direction of the arrows. Fig. 5 is an enlarged end view of the mounting of the main cultivating wheel shaft. Fig. 6 is a similar view of a mounting of the auxiliary or secondary row of elevating wheels.

In the drawings 10 indicates a pair of spaced and preferably parallel, transverse angle members which are secured together by means of the end angle frames 11, which constitutes the main side frames of the machine. The end angle frames 11 are preferably triangular in shape with the apex inverted, as shown clearly in Fig. 1. In the apex of said side frames there is rotatably mounted what may be termed a main shaft 12 which carries a plurality of rotatable agricultural instruments which are herein shown as curved or scalloped wheels 13. The particular mounting of the shaft 12 with the wheels 13 attached thereto in the side frames, will be hereinafter more particularly described.

Preferably mid-way between said side frames 11 and secured to the rear angle frame 10 is a bifurcated bracket 14 which pivotally supports one end of an elongated tongue 15 which extends transversely of the frame work hereinbefore described and projects forwardly of the same. Suitably but rigidly secured to the other angle frame 10, as by means of the nut and bolts 16, is an upwardly extending loop or strap 17 which is of such dimensions that the pole 15 extends through the same and is slidable therein when rocked upon its pivotal support 14. The strap or loop 17 is provided with an opening 18 adapted to receive suitable stop or pin means, whereby the tongue 15 will be rigidly secured to said framework hereinbefore described, such that the tongue will support said frame work. The last mentioned condition is especially desired when the packer is used with but a single or main row of cultivating wheels 13, as herein described. When the packer is to be used with a plurality of rows of cultivating wheels such as the auxiliary wheels 19 the tongue 15 is supported upon the frame work with a pivotal connection so that said tongue may move in the loop 17 and thereby eliminate the transmission of all the movements of the frame to the collars of the draft animals or to the draft means.

Various conditions are encountered when the machine described is used as a packer, since the earth to be packed may have been just previously plowed or may have been plowed two or three days previously, or the earth to be packed may have been plowed many months before and have been cultivated and the grain may have been growing in the field to be packed. In the instances mentioned the moisture and ground conditions will vary and it will be desirable to apportion the load in such a manner that the desired packing conditions will be obtained. Thus, when a hard crust is encountered with a relatively soft sub-soil the greater amount of weight should be upon the front or forward row of cultivating wheels while less weight should be upon the rear wheels. When, however, there is no crust the weight should be equally distributed upon both rows of wheels.

The auxiliary row of cultivating wheels 19 is supported upon the frame work in an improved manner such that said row of cultivating wheels will receive the desired portion of the load and will always yield with the inequalities of the earth's surface over which they travel. The wheels 19 are rotatably supported upon a shaft 25. The ends of said shaft 25 are rotatably supported in the ends of a pair of arms or auxiliary side frames 26, the other ends of which are pivotally supported at 27 upon the side frames 11, as shown. Extending upwardly from each of the arms 26 is a projecting portion or bracket 28 suitably slotted at 29. Pivotally supported by a depending arm or tongue 30 positioned beneath the bracket 14 and thus medianly of the frame and upon said frame is a transverse balance bar 31, the outer ends of which extend through the slots 29 in the projecting bracket portions 28 and thus serve to transmit the load of the frame to the rear row of cultivating wheels, yet permit said cultivating wheels to follow the inequalities of the ground such that the shaft 25 will lie parallel thereto, thus providing a flexible construction heretofore unknown. The particular mounting of the rear row of wheels in the arms 26 will be hereinafter described in detail. It is to be understood that the arms 26 may be disconnected at their pivotal support 27 from the side frames 11 and the transverse pivotal bar 31 may be also disengaged from its pivotal support 30, thus forming a single row packer from a plural row packer.

The means for varying the load hereinbefore indicated will now be described in detail. Suitably secured upon the frame work and rigidly and medianly thereof, by means of the bracing strap member 32, see Figs. 1 and 3, is a depending front plate 33 provided with a plurality of spaced holes or openings 34 therein. Suitably secured to the rear portion of the frame work and extending forwardly beneath the frame work is a bracing member or bar 35, the forward end of which is rigidly secured to the depending plate portion 33 to reenforce and brace the same. Associated with said plate portion 33 is the clevis 36 which is adjustably secured upon the plate portion 33 by means of the pin 37, said pin being receivable by any one of the openings 34. Associated with the clevis 36 is the usual double tree or draft chain 38 suitably secured thereto by means of the block 30 and pin 40. Thus, the draft chain 38 or the double trees when the same are used through which the propelling power is transmitted, is adapted to be adjustably positioned with respect to the rectangular frame work hereinbefore described such that the line of draft may be varied in order to distribute the weight in the desired proportions to the front and rear rollers or wheels. Thus, when the pin 37 is positioned in the upper openings 34, a greater portion of the load will be carried by the front wheels 13, while when the pin 37 is positioned in the lower openings more of the load will be carried by the rear wheels 19, and when said pin 37 is medianly positioned between the aforesaid limits the load will be distributed substantially equally between the front and rear rows of wheels.

Reference will now be had to Figs. 5 and 6 wherein the bearings for the shafts 12 and 25 are shown in detail. The side frames 11 adjacent the apex thereof are provided with slots 41 which are provided with substantially semi-octagonal head portions 42 and upon each face of said semi-octagonal head portion is a projecting arcuate or curved portion 43 which may be an insert in said frame 11 or may be formed integral therewith or may be a ball bearing. The shaft 12 carries a suitable ring 44 which bears upon said projecting curved portions 43, as shown. The shaft and ring or collar 44 are secured in the slot 41 by means of the pin 45 suitably secured, such as by the means illustrated. Since weight will always be transmitted to the front roller shaft 12, the lower bearing portion is omitted for the slot retaining pin 45 is sufficient to lock said shaft in the side frames 11.

However, since the rear shaft and wheels may be detached from the construction hereinbefore described, the arms 26 are provided with an octagonal opening 36 and in said opening is positioned curved bearing portions 47 substantially similar to the portions 43 illustrated in Fig. 5. The shaft 25 is provided with a collar or ring 48 which bears upon the curved portions 47 and this provides the bearing, as shown. It will, of course, be understood that suitable means is associated with each of the shafts 12 and 25 to retain said shafts in the side frames 11 and 26 and prevent shaft axial movement thereof.

Reference will now be had to Figs. 1 and 4 wherein the novel forecarriage construction is illustrated in detail, which is rotatably supported on the forward end of the tongue 40. Upon the forward free end 49 of the tongue 15 is rotatably supported a shaft or spindle 51. The shaft 51 thereof suitably supports an axle 54 upon which is supported the usual pair of wheels 55. The shaft 51 also supports an outwardly projecting bracket arm 56 which is rigidly secured thereto by means of a collar portion 157 and said outwardly projecting arm 56 extends upwardly at 57 and provides an opening or loop 58. A loop or elongated link 59 straddles the shaft 51 and extends through the opening 58 of the upper projection 57. To the rear portion of the loop or link 59 adjacent the spindle 51 is secured the end of the draft chain 38. To the other end of the loop 59 may be secured the drafting means. Thus, when it is desired to turn the packer the traction means or team is turned which, through the link 59 and the arm 57, turns the shaft 51 and wheels 55 so that said traction means or team can execute a substantially right angle turn and thus turn the packer upon either side frame 11 as a pivot to execute a sharper turn than could otherwise be executed if the traction means or team were hitched directly to the clevis 36. Thus, shortening or slackening of the draft chain 48 in the turning movement, it will be noted from Fig. 1 is prevented since the loop or link 59 moves arcuately about the center of the shaft 51 such that said draft chain 38 does not slacken or shorten but is maintained substantially rigid at all times. Since the tongue is pivotally associated with the packer, the same has relative movement and the aforesaid loop or link 59 permits the draft means to be shortened or lengthened as required to adjust the same to maintain said draft means taut and yet permit such relative movement.

When the fore carriage structure hereinbefore described is omitted, the traction means whether power means or draft animals are connected to the packer at the clevis 36 and a simple tongue is used in the customary manner.

While the invention has been described in great detail and various modifications thereof will readily suggest themselves to those skilled in the art to which this invention applies, it is to be understood that said modifications are considered to be within the broad purview of this invention as outlined by the appended claims and the foregoing specifications and drawings are to be considered as illustrative rather than restrictive in character of the parts or their equivalents.

We claim—

1. In a land pulverizer, the combination of a cultivating device supporting frame, a second frame adapted to support a second cultivating device, means pivotally connecting said second frame to said first frame for rocking movement upon a longitudinal axis, and other means pivotally connecting said second frame to said first frame for rocking movement upon a transverse axis.

2. In a land pulverizer, the combination of a plurality of rows of cultivating devices adapted to be supported one behind the other, frame means rotatably supporting one row of cultivating devices, other frame means rotatably supporting the row of said cultivating devices in the rear of said first mentioned row, and means connecting the other frame means to the first mentioned frame means for pivotal movement upon two axes which are transverse of each other.

3. In a land pulverizer, the combination of a cultivating device supporting frame, a second frame adapted to support a second cultivating device and positioned adjacent the first mentioned frame, means pivotally connecting the second mentioned frame to the first mentioned frame at the ends of the latter, and other means pivotally connecting said second mentioned frame to said first mentioned frame for pivotal movement upon an axis transversely of the first mentioned pivotal axis.

4. In a land pulverizer, the combination of a frame, a second frame positioned adjacent the first mentioned frame, means pivotally connecting the second mentioned frame to the first mentioned frame at the ends of the latter, and means positioned intermediate the first mentioned pivotal means for pivotally connecting said second mentioned frame to said first mentioned frame for pivotal movement upon an axis transversely of the first mentioned pivotal axis.

5. In a land pulverizer, the combination of a frame, a row of cultivating devices rotatably supported in said frame, a second row of cultivating devices adjacent said first mentioned row of cultivating devices, frame means rotatably supporting said second mentioned row of cultivating devices, means pivotally connecting said second mentioned frame means to said first mentioned frame means upon the opposite side of the first mentioned cultivating devices' axis from said second mentioned cultivating devices' axis, and means pivotally connecting said second mentioned frame means to said first mentioned frame means for pivotal movement upon an axis at right angles to the first mentioned pivotal axis.

6. In a land pulverizer, the combination of a frame, a second frame, means pivotally connecting said frames for rocking movement, said means permitting said frames to have rocking movement about two axes which are transverse of each other, and tongue means pivotally supported upon one of said frame means and arranged to tilt with respect to one of said frames.

7. In a land pulverizer, the combination of a frame, a second frame adjacent the first frame and pivotally supported thereon for rocking movement upon a transverse axis and for rocking movement upon a longitudinal axis, and tongue means pivotally supported on said first mentioned frame means for rocking movement.

8. In a land pulverizer, the combination of a plurality of rows of cultivating devices, frame means rotatably supporting one of said rows of cultivating devices, other frame means rotatably supporting a second row of cultivating devices, means pivotally connecting said second frame means to said first frame means for movement about a longitudinal axis, and tongue means pivotally supported upon one of said frame means for movement about a longitudinal axis.

9. In a land pulverizer, the combination of a plurality of rows of cultivating devices, frame means rotatably supporting one of said rows of cultivating devices, other frame means rotatably supporting a second row of cultivating devices, means pivotally connecting said second frame means to said first frame means for movement about a longitudinal axis, and tongue means pivotally supported upon one of said frame means for movement about a longitudinal axis, said pivotal axis of the frame support being positioned upon the opposite side of the rotatable axis of the first mentioned row of cultivating devices from the second mentioned row of cultivating devices, the axis of said tongue pivotal support being positioned intermediate the frame pivotal supporting axis and rotatable supporting axis of the second mentioned cultivating devices.

10. In a land pulverizer, the combination of a frame, tongue means pivotally supported upon said frame, and adjustable draft means associated with said frame.

11. In a land pulverizer, the combination of a plurality of rows of cultivating devices, frame means rotatably supporting one of said rows, other frame means rotatably supporting another of said rows, means pivotally connecting the second frame means to the first frame means, and adjustable draft means associated with said first frame means for distributing the load between said cultivating devices.

12. In a land pulverizer, the combination of a plurality of rows of cultivating devices, frame means rotatably supporting one of said rows, other frame means rotatably supporting another of said rows, means pivotally connecting the second frame means to the first frame means, adjustable draft means associated with said first frame means for distributing the load between said cultivating devices, and tongue means pivotally supported upon said first mentioned frame means.

13. In a land pulverizer, the combination of a frame, a row of cultivating devices rotatably supported in said frame, a second row of cultivating devices supported adjacent said first mentioned row of cultivating devices, frame means rotatably supporting said second mentioned row of cultivating devices, means pivotally connecting said second mentioned frame to said first mentioned frame, other means pivotally connecting said second mentioned frame to said first mentioned frame for rocking movement at and upon an axis at right angles to the first mentioned pivotal support, and adjustable draft means for proportioning the load between said rows of cultivating devices.

14. In a land pulverizer, the combination of a frame, a row of cultivating devices rotatably supported in said frame, a second row of cultivating devices supported adjacent said first mentioned row of cultivating devices, frame means rotatably supporting said second mentioned row of cultivating devices, means pivotally connecting said second mentioned frame to said first mentioned frame, other means pivotally connecting said second mentioned frame to said first mentioned frame for rocking movement at and upon an axis at right angles to the first mentioned pivotal support, adjustable draft means for proportioning the load between said rows of cultivating devices, and tongue means pivotally supported upon said first mentioned frame means.

15. In a land pulverizer, the combination of a frame, a row of cultivating devices rotatably supported thereby, a second frame, a second row of cultivating devices rotatably supported by said second mentioned frame, means pivotally connecting said second mentioned frame to said first mentioned frame for rocking movement about a longitudinal axis, tongue means pivotally connected to said first mentioned frame for rocking movement about a longitudinal axis, and means for securing said tongue means rigidly upon said frame means to permit said plural row pulverizer to operate as a single row pulverizer when said second mentioned row of cultivating devices is detached therefrom.

16. The combination of an agricultural implement, tongue means tiltably mounted on said agricultural implement, draft means connected to said agricultural implement and associated at the other end to said tongue means, and means permitting said draft means to be shortened and lengthened in the rocking movement of said tongue means and said agricultural implement relative to each other.

17. The combination of an agricultural implement, tongue means tiltably mounted on said agricultural implement, draft means adjustably connected to said agricultural implement and associated at the other end to said tongue means, and means permitting said draft means to be shortened and lengthened in the rocking movement of said tongue means and said agricultural implement relative to each other.

In witness whereof, we have hereunto affixed our signatures.

JOHN I. HOKE.
LYNN I. HOKE.